(12) United States Patent
Ichikawa et al.

(10) Patent No.: US 9,887,553 B2
(45) Date of Patent: Feb. 6, 2018

(54) ELECTRIC POWER TRANSMISSION DEVICE, AND ELECTRIC POWER RECEPTION DEVICE AND VEHICLE INCLUDING THE SAME

(71) Applicant: TOYOTA JIDOSHA KABUSHIKI KAISHA, Toyota-shi, Aichi-ken (JP)

(72) Inventors: Shinji Ichikawa, Toyota (JP); Naoki Gorai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 319 days.

(21) Appl. No.: 14/746,196

(22) Filed: Jun. 22, 2015

(65) Prior Publication Data

US 2016/0028241 A1 Jan. 28, 2016

(30) Foreign Application Priority Data

Jul. 22, 2014 (JP) ................................. 2014-148953

(51) Int. Cl.
| | |
|---|---|
| *H01F 38/00* | (2006.01) |
| *H02J 5/00* | (2016.01) |
| *B60L 11/18* | (2006.01) |
| *H02J 7/02* | (2016.01) |
| *H02J 50/12* | (2016.01) |
| *H02J 50/10* | (2016.01) |
| *H02J 50/05* | (2016.01) |
| *H01F 38/14* | (2006.01) |

(52) U.S. Cl.
CPC ............. *H02J 5/005* (2013.01); *B60L 11/182* (2013.01); *H02J 7/025* (2013.01); *H02J 50/12* (2016.02); *H01F 38/14* (2013.01); *H02J 50/05* (2016.02); *H02J 50/10* (2016.02)

(58) Field of Classification Search
None
See application file for complete search history.

(56) References Cited

U.S. PATENT DOCUMENTS

| | | | | |
|---|---|---|---|---|
| 3,860,757 A | * | 1/1975 | Stewart ................... | H04M 7/16 370/488 |
| 4,839,542 A | * | 6/1989 | Robinson ............. | H03H 11/045 327/558 |

(Continued)

FOREIGN PATENT DOCUMENTS

| | | |
|---|---|---|
| AU | 2006269374 B2 | 1/2007 |
| AU | 2006269374 C1 | 1/2007 |

(Continued)

OTHER PUBLICATIONS

Scherz, Paul, "Passages: Practical Electronics for Inventors," Apr. 15, 2000. pp. 46-53 and pp. 247-267.

(Continued)

*Primary Examiner* — Tuan T Lam
(74) *Attorney, Agent, or Firm* — Oliff PLC

(57) ABSTRACT

In connection with a filter circuit, an inductance of a coil is set to $Z01/\omega$, a capacitance of a capacitor is set to $(a1+1)/(a1 \cdot \omega \cdot Z01)$, an inductance of a coil is set to $a1 \cdot Z01/\omega$, and a capacitance of a capacitor is set to $(a1+1)/(a1^2 \cdot \omega \cdot Z01)$, where $\omega$ represents a frequency of an inverter, a1 represents a ratio of an output voltage to an input voltage of the filter circuit, and Z01 represents any design value.

11 Claims, 3 Drawing Sheets

(56) References Cited

U.S. PATENT DOCUMENTS

| | | | |
|---|---|---|---|
| 5,530,638 A * | 6/1996 | Wu | H02M 3/335 363/131 |
| 7,741,734 B2 | 6/2010 | Joannopoulos et al. | |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0033248 A1 * | 2/2010 | Handa | H03F 3/2173 330/251 |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2013/0057082 A1 | 3/2013 | Takada et al. | |
| 2013/0127409 A1 | 5/2013 | Ichikawa | |
| 2013/0193749 A1 | 8/2013 | Nakamura et al. | |
| 2013/0320759 A1 * | 12/2013 | Abe | H01F 38/14 307/10.1 |
| 2014/0074332 A1 | 3/2014 | Ichikawa et al. | |
| 2015/0098522 A1 * | 4/2015 | Shimizu | H04L 27/364 375/296 |
| 2015/0303703 A1 * | 10/2015 | Hayashi | H02J 5/005 307/104 |
| 2015/0326031 A1 * | 11/2015 | Yamaguchi | H02J 17/00 307/104 |
| 2016/0094081 A1 * | 3/2016 | Lee | H02J 5/005 320/108 |
| 2016/0221451 A1 * | 8/2016 | Plum | H02J 17/00 |
| 2016/0294217 A1 * | 10/2016 | Mi | H02J 50/90 |
| 2016/0347188 A1 * | 12/2016 | Nakahara | H01F 38/14 |
| 2016/0347189 A1 * | 12/2016 | Nakahara | H01F 38/14 |
| 2016/0352153 A1 * | 12/2016 | Nakahara | H01F 38/14 |
| 2017/0047768 A1 * | 2/2017 | Diekhans | B60L 11/182 |
| 2017/0063161 A1 * | 3/2017 | Sugiyama | H02J 50/12 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2002-049428 A | 2/2002 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2014-023414 A | 2/2014 |
| JP | 2014-054095 A | 3/2014 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2013/108108 A2 | 7/2013 |

OTHER PUBLICATIONS

Sedra, Adel S. et al., "Chapter 16: Filters and Tuned Amplifiers," Microelectronic Circuits, 6th Edition, Dec. 15, 2009, pp. 1254-1328.

* cited by examiner

ELECTRIC POWER TRANSMISSION DEVICE, AND ELECTRIC POWER RECEPTION DEVICE AND VEHICLE INCLUDING THE SAME

This nonprovisional application is based on Japanese Patent Application No. 2014-148953 filed with the Japan Patent Office on Jul. 22, 2014, the entire contents of which are hereby incorporated by reference.

BACKGROUND OF THE INVENTION

Field of the Invention

This invention relates to an electric power transmission device, as well as an electric power reception device and a vehicle including the same, and particularly to an electric power transmission device and an electric power reception device used for an electric power transfer system in which electric power is transferred in a non-contact manner from the electric power transmission device to the electric power reception device, as well as a vehicle including the electric power reception device.

Description of the Background Art

Non-contact electric power transfer without using a power supply cord or an electric power transmission cable has attracted attention as an electric power transmission method. For example, Japanese Patent Laying-Open No. 2014-54095 discloses such a non-contact electric power feeding system. In this non-contact electric power feeding system, in order to suppress harmonic noise generated from an alternating-current power supply (a power supply portion) generating alternating-current electric power, a filter circuit (a matching device) is provided between the power supply portion and an electric power transmission portion.

In general, a filter circuit (a matching device) includes a coil and a capacitor. Japanese Patent Laying-Open No. 2014-54095, however, is silent about a specific circuit configuration of a filter circuit (a matching device). When a phase difference of a voltage and a current takes place owing to a filter circuit including a coil and a capacitor, efficiency in electric power transfer from an electric power transmission device to an electric power reception device lowers.

SUMMARY OF THE INVENTION

Therefore, an object of this invention is to suppress lowering in efficiency in electric power transfer caused by providing a filter circuit in an electric power transmission device used in an electric power transfer system in which electric power is transferred from the electric power transmission device to an electric power reception device in a non-contact manner.

Another object of this invention is to suppress lowering in efficiency in electric power transfer caused by providing a filter circuit in an electric power reception device used in an electric power transfer system in which electric power is transferred from an electric power transmission device to the electric power reception device in a non-contact manner and in a vehicle including the same.

According to this invention, an electric power transmission device includes an alternating-current power supply, an electric power transmission portion configured to transmit in a non-contact manner, electric power output from the alternating-current power supply to an electric power reception device, and a filter circuit provided between the alternating-current power supply and the electric power transmission portion. The filter circuit includes first and second coils and first and second capacitors. The first and second coils are provided in at least one of a power line pair connected between the alternating-current power supply and the electric power transmission portion. The first and second capacitors are connected between the power line pair and provided alternately with the first and second coils between the alternating-current power supply and the electric power transmission portion. The first and second coils and the first and second capacitors are provided in an order of the first coil, the first capacitor, the second coil, and the second capacitor from a side of the alternating-current power supply. An inductance of the first coil is set to $Z/\omega$, a capacitance of the first capacitor is set to $(a+1)/(a\omega Z)$, an inductance of the second coil is set to $aZ/\omega$, and a capacitance of the second capacitor is set to $(a+1)/(a^2\omega Z)$, where $\omega$ represents a frequency of the alternating-current power supply, a represents a ratio of an output voltage from the filter circuit to an input voltage to the filter circuit, and Z represents any design value.

Preferably, the alternating-current power supply includes a voltage type inverter.

Further preferably, aforementioned a is determined based on a rated voltage of the voltage type inverter and a maximum value which can be taken by a voltage of the electric power transmission portion.

Preferably, the first coil is implemented by third and fourth coils resulting from division into two and provided in balance in both of the power line pair. The second coil is implemented by fifth and sixth coils resulting from division into two and provided in balance in both of the power line pair. An inductance of each of the third and fifth coils is set to $Z/(2\omega)$. An inductance of each of the fourth and sixth coils is set to $aZ/(2\omega)$.

Preferably, the electric power transmission device further includes a phase compensation coil. The phase compensation coil is provided on an output side of the alternating-current power supply, for suppressing phase advance of an output current from the alternating-current power supply.

Further preferably, the phase compensation coil is integrated with the first coil.

According to this invention, an electric power reception device includes an electric power reception portion configured to receive in a non-contact manner, alternating-current electric power output from an electric power transmission device, a rectification portion rectifying alternating-current electric power received by the electric power reception portion, and a filter circuit provided between the electric power reception portion and the rectification portion. The filter circuit includes first and second coils and first and second capacitors. The first and second coils are provided in at least one of a power line pair connected between the electric power reception portion and the rectification portion. The first and second capacitors are connected between the power line pair and provided alternately with the first and second coils between the electric power reception portion and the rectification portion. The first and second coils and the first and second capacitors are provided in an order of the first capacitor, the first coil, the second capacitor, and the second coil from a side of the electric power reception portion. A capacitance of the first capacitor is set to $1/(\omega Z)$, an inductance of the first coil is set to $(a+1)Z/\omega$, a capacitance of the second capacitor is set to $1/(a\omega Z)$, and an inductance of the second coil is set to $a(a+1)Z/\omega$, where $\omega$ represents a frequency of the alternating-current electric power, a represents a ratio of an output voltage from the filter circuit to an input voltage to the filter circuit, and Z represents any design value.

Preferably, the rectification portion is implemented by a capacitor input type rectification circuit.

Preferably, aforementioned a is set to $4V/(\pi\sqrt{(2Pk\omega L)})$, where V represents an output voltage from the rectification portion, P represents electric power received by the electric power reception portion, k represents a coefficient of coupling, and L represents an inductance of a coil of each of the electric power reception portion and an electric power transmission portion of the electric power transmission device.

Preferably, the first coil is implemented by third and fourth coils resulting from division into two and provided in balance in both of the power line pair. The second coil is implemented by fifth and sixth coils resulting from division into two and provided in balance in both of the power line pair. An inductance of each of the third and fifth coils is set to $(a+1)Z/(2\omega)$. An inductance of each of the fourth and sixth coils is set to $a(a+1)Z/(2\omega)$.

According to this invention, a vehicle includes any electric power reception device described above.

In this invention, according to the configuration as above, a filter circuit has ideal transformer characteristics, and hence a filter circuit causes no change in phase of a voltage and a current. Therefore, according to this invention, lowering in efficiency in electric power transfer caused by providing a filter circuit can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
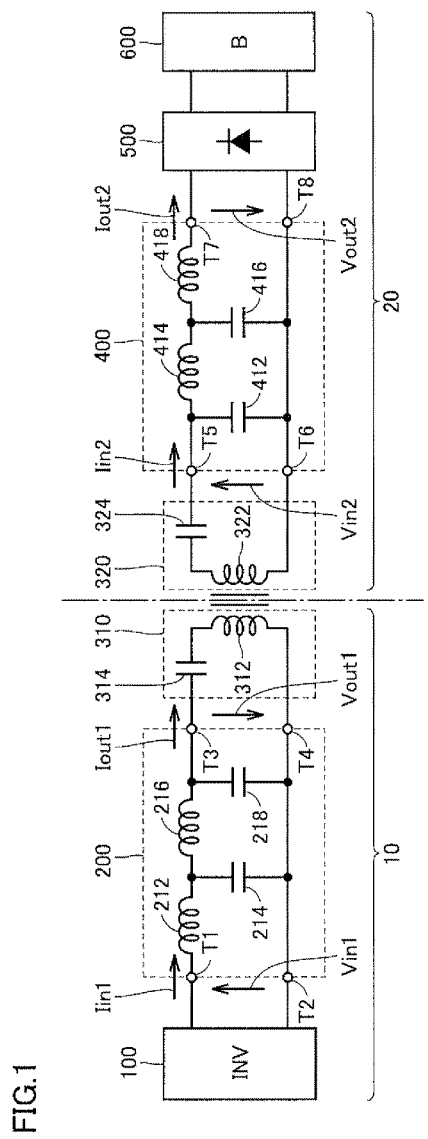
FIG. 1 is an overall configuration diagram of an electric power transfer system according to an embodiment of this invention.

An embodiment of the present invention will be described hereinafter in detail with reference to the drawings. The same or corresponding elements in the drawings have the same reference characters allotted and description thereof will not be repeated.

FIG. 1 is an overall configuration diagram of an electric power transfer system according to an embodiment of this invention. Referring to FIG. 1, this electric power transfer system includes an electric power transmission device 10 and an electric power reception device 20. This electric power transfer system is applicable, for example, to a case that a power storage device mounted on an electrically powered vehicle such as a hybrid vehicle or an electric vehicle is charged by electric power transmission device 10 provided outside the vehicle, and electric power reception device 20 can be mounted on such an electrically powered vehicle.

Electric power transmission device 10 includes an inverter 100, a filter circuit 200, and an electric power transmission portion 310. Inverter 100 functions as an alternating-current power supply supplying alternating-current electric power to electric power transmission portion 310 and generates alternating-current electric power having a prescribed transmission frequency ω. In the present embodiment, inverter 100 is a voltage type inverter, and for example, implemented by a single-phase full-bridge circuit including a smoothing capacitor provided on an input side and four semiconductor devices.

Filter circuit 200 is provided between inverter 100 and electric power transmission portion 310 and suppresses harmonic noise generated by inverter 100. Filter circuit 200 is implemented by a fourth-order LC filter including two coils 212 and 216 and two capacitors 214 and 218. A configuration of filter circuit 200 will be described in detail later.

Electric power transmission portion 310 includes a coil 312 and a capacitor 314. Capacitor 314 is provided to adjust a resonant frequency of electric power transmission portion 310, and together with coil 312, forms a resonant circuit as being connected in series to coil 312. Electric power transmission portion 310 receives alternating-current electric power having transmission frequency ω from inverter 100, and transmits electric power in a non-contact manner to an electric power reception portion 320 of electric power reception device 20 through electromagnetic field generated around coil 312.

Electric power reception device 20 includes electric power reception portion 320, a filter circuit 400, a rectification portion 500, and a power storage device 600. Electric power reception portion 320 includes a coil 322 and a capacitor 324. Capacitor 324 is provided to adjust a resonant frequency of electric power reception portion 320, and together with coil 322, forms a resonant circuit as being connected in series to coil 322. Electric power reception portion 320 receives electric power output from electric power transmission portion 310 through electromagnetic field generated between electric power reception portion 320 and electric power transmission portion 310 of electric power transmission device 10, and outputs electric power to filter circuit 400. A Q factor representing resonance intensity of electric power transmission portion 310 and electric power reception portion 320 is preferably equal to or higher than 100.

Filter circuit 400 is provided between electric power reception portion 320 and rectification portion 500 and suppresses harmonic noise generated during electric power reception from electric power transmission device 10. Filter circuit 400 is implemented by a fourth-order LC filter including two capacitors 412 and 416 and two coils 414 and 418. A configuration of filter circuit 400 will also be described in detail later.

Rectification portion 500 rectifies alternating-current electric power received by electric power reception portion 320 and outputs rectified electric power to power storage device 600. In the present embodiment, rectification portion 500 is implemented by a capacitor input type rectification circuit, and specifically includes a single-phase bridge rectification circuit including four diodes and a capacitor provided on an output side.

Power storage device 600 is a rechargeable direct-current power supply, and implemented, for example, by such a secondary battery as a lithium ion battery or a nickel metal hydride battery. Power storage device 600 stores electric power output from rectification portion 500. A large-capacity capacitor can also be adopted as power storage device 600. Though not particularly illustrated, a DC-DC converter regulating an output voltage from rectification portion 500 may be provided between rectification portion 500 and power storage device 600.

In this electric power transfer system, in order to suppress harmonic noise generated during electric power transfer from electric power transmission device 10 to electric power reception device 20, filter circuit 200 is provided in electric power transmission device 10 and filter circuit 400 is provided in electric power reception device 20. Each of filter circuits 200 and 400 includes a coil and a capacitor. Here, since the coil and the capacitor change a phase difference of a voltage and a current, efficiency in electric power transfer from electric power transmission device 10 to electric power reception device 20 may lower due to change in phase involved with introduction of filter circuits 200 and 400.

Then, the electric power transfer system according to this embodiment is designed such that filter circuit 200 is implemented by a fourth-order LC filter including two coils and two capacitors, an inductance of each coil and a capacitance of each capacitor are designed as described below, and thus filter circuit 200 has ideal transformer characteristics. Similarly, electric power reception device 20 is also designed such that filter circuit 400 is implemented by a fourth-order LC filter including two coils and two capacitors, an inductance of each coil and a capacitance of each capacitor are designed as described below, and thus filter circuit 400 has ideal transformer characteristics. A configuration of each of filter circuits 200 and 400 will now be described in detail.

Referring to FIG. 1, filter circuit 200 of electric power transmission device 10 includes coils 212 and 216 and capacitors 214 and 218. Coils 212 and 216 are provided in one of a power line pair between inverter 100 and electric power transmission portion 310, and in this embodiment, coils 212 and 216 are connected in series between terminals T1 and T3. Capacitor 214 is connected between the power line pair, between coils 212 and 216. Capacitor 218 is connected between the power line pair, on a side of electric power transmission portion 310 relative to coil 216. Namely, coils 212 and 216 and capacitors 214 and 218 are provided in the order of coil 212, capacitor 214, coil 216, and capacitor 218, from a side of inverter 100.

An inductance L1 of coil 212, a capacitance C1 of capacitor 214, an inductance L2 of coil 216, and a capacitance C2 of capacitor 218 are set to values shown below, respectively.

$$L1 = Z01/\omega \ [H] \tag{1}$$

$$C1 = (a1+1)/(a1 \cdot \omega \cdot Z01)[F] \tag{2}$$

$$L2 = a1 \cdot Z01/\omega \ [H] \tag{3}$$

$$C2 = (a1+1)/(a1^2 \cdot \omega \cdot Z01)[F] \tag{4}$$

Here, Z01 is any constant. For example, when a value for Z01 is greater, inductances L1 and L2 are greater and capacitances C1 and C2 are smaller. Magnitude of Z01 can be determined in consideration of ease in manufacturing (cost) or heat generation of coils 212 and 216 and capacitors 214 and 218. a1 represents a ratio of an output voltage Vout1 from filter circuit 200 (that is, a voltage of electric power transmission portion 310) to an input voltage Vin1 to filter circuit 200 (that is, an output voltage from inverter 100). ω represents a frequency of transferred electric power (corresponding to a frequency of electric power generated by inverter 100).

An F parameter (a transfer matrix) for filter circuit 200 designed as in the expressions (1) to (4) above is calculated and summarized, and then an F parameter for filter circuit 200 is shown in an expression below.

$$\begin{bmatrix} Vin1 \\ Iin1 \end{bmatrix} = \begin{bmatrix} -\frac{1}{a1} & 0 \\ 0 & -a1 \end{bmatrix} \cdot \begin{bmatrix} Vout1 \\ Iout1 \end{bmatrix} \tag{5}$$

Here, Vin1 and Iin 1 represent an input voltage and an input current to filter circuit 200, respectively, and Vout1 and Iout1 represent an output voltage and an output current from filter circuit 200, respectively. Based on this expression (5), relation of input and output of filter circuit 200 is as follows.

$$Vin1 = -(1/a1)Vout1 \tag{6}$$

$$Iin1 = -a1 \cdot Iout1 \tag{7}$$

The expressions (6) and (7) show that filter circuit 200 has ideal transformer characteristics. Namely, filter circuit 200 causes no change in phase of a transmission voltage and a transmission current. Therefore, lowering in efficiency in electric power transfer due to introduction of filter circuit 200 can be suppressed.

a1 representing a ratio between input and output voltages of filter circuit 200 can be determined, for example, based on a rated voltage of inverter 100 and a maximum value which can be taken by voltage Vout1 corresponding to a voltage of electric power transmission portion 310 (when electric power reception portion 320 is opposed to electric power transmission portion 310) such that an input voltage Vin1 to filter circuit 200 is accommodated in the specifications of inverter 100.

Filter circuit 400 of electric power reception device 20 will now be described. Filter circuit 400 includes capacitors 412 and 416 and coils 414 and 418. Coils 414 and 418 are provided in one of a power line pair between electric power reception portion 320 and rectification portion 500, and in this embodiment, coils 414 and 418 are connected in series between terminals T5 and T7. Capacitor 412 is connected between the power line pair on a side of electric power reception portion 320 relative to coil 414. Capacitor 416 is connected between the power line pair between coils 414 and 418. Namely, capacitors 412 and 416 and coils 414 and 418 are provided in the order of capacitor 412, coil 414, capacitor 416, and coil 418 from a side of electric power reception portion 320.

A capacitance C3 of capacitor 412, an inductance L3 of coil 414, a capacitance C4 of capacitor 416, and an inductance L4 of coil 418 are set to values shown below, respectively.

$$C3 = 1/(\omega \cdot Z02)[F] \tag{8}$$

$$L3 = (a2+1) \cdot Z02/\omega \ [H] \tag{9}$$

$$C4 = 1/(a2 \cdot \omega \cdot Z02)[F] \tag{10}$$

$$L4 = a2 \cdot (a2+1) \cdot Z01/\omega \ [H] \tag{11}$$

Here, Z02 is any constant. For example, when a value for Z02 is greater, inductances L3 and L4 are greater and capacitances C3 and C4 are smaller. Magnitude of Z02 can be determined in consideration of ease in manufacturing (cost) or heat generation of capacitors 412 and 416 and coils 414 and 418. a2 represents a ratio of an output voltage Vout2 from filter circuit 400 to an input voltage Vin2 to filter circuit 400 (that is, a voltage of electric power reception portion 320).

An F parameter for filter circuit 400 designed as in the expressions (8) to (11) above is calculated and summarized, and then an F parameter for filter circuit 400 is shown in an expression below.

$$\begin{bmatrix} Vin2 \\ Iin2 \end{bmatrix} = \begin{bmatrix} -\frac{1}{a2} & 0 \\ 0 & -a2 \end{bmatrix} \cdot \begin{bmatrix} Vout2 \\ Iout2 \end{bmatrix} \quad (12)$$

Here, Vin2 and Iin 2 represent an input voltage and an input current to filter circuit 400, respectively, and Vout2 and Iout2 represent an output voltage and an output current from filter circuit 400, respectively. Based on this expression (12), relation of input and output of filter circuit 400 is as follows.

$$Vin2 = -(1/a2)Vout2 \quad (13)$$

$$Iin2 = -a2 \cdot Iout2 \quad (14)$$

The expressions (13) and (14) show that filter circuit 400 has ideal transformer characteristics. Namely, filter circuit 400 causes no change in phase of a voltage and a current. Therefore, lowering in efficiency in electric power transfer due to introduction of filter circuit 400 can be suppressed.

a2 representing a ratio between input and output voltages of filter circuit 400 is preferably set to such a value as achieving an impedance which can maximize efficiency in electric power transfer from electric power transmission portion 310 to electric power reception portion 320. Namely, with a voltage of power storage device 600 being denoted as Vb, when rectification portion 500 is implemented by a capacitor input type rectification circuit, output voltage Vout2 from a filter circuit corresponding to an input voltage to rectification portion 500 is shown in an expression below.

$$Vout2 = Vb \cdot 2\sqrt{2}/\pi$$

An optimal impedance maximizing efficiency in electric power transfer from electric power transmission portion 310 to electric power reception portion 320 has been known as $k \cdot \omega \cdot Lr$ (k: coefficient of coupling, Lr: an inductance of coil 322), for example, when coil 312 and coil 322 are equal to each other in inductance, and a voltage received by electric power reception portion 320, that is, input voltage Vin2 to filter circuit 400, which realizes an optimal impedance is shown in an expression below.

$$Vin2 = \sqrt{(Pr \times (k \cdot \omega \cdot Lr))}$$

Here, Pr represents electric power received by electric power reception portion 320. Therefore, a2 which can maximize efficiency in electric power transfer from electric power transmission portion 310 to electric power reception portion 320 is shown in an expression below.

$$a2 = Vout2/Vin2 = 4 \cdot Vb/(\pi \cdot \sqrt{(2 \cdot Pr \cdot k \cdot \omega \cdot Lr)})$$

As above, according to this embodiment, since filter circuit 200 of electric power transmission device 10 has ideal transformer characteristics, filter circuit 200 causes no change in phase of a voltage and a current. Therefore, according to this embodiment, lowering in efficiency in electric power transfer caused by providing filter circuit 200 in electric power transmission device 10 can be suppressed.

In addition, according to this embodiment, since filter circuit 400 of electric power reception device 20 also has ideal transformer characteristics, filter circuit 400 causes no change in phase of a voltage and a current. Therefore, according to this embodiment, lowering in efficiency in electric power transfer caused by providing filter circuit 400 in electric power reception device 20 can be suppressed.

In the embodiment above, values for $Z01/\omega$ in inductance L1 of coil 212 and inductance L2 of coil 216 do not necessarily have to strictly match with each other, and deviation therebetween approximately up to ±10% is allowed. Similarly, values for $\omega \cdot Z01$ in capacitance C1 of capacitor 214 and capacitance C2 of capacitor 218 do not necessarily have to strictly match with each other either, and deviation therebetween approximately up to ±10% is allowed.

This is also the case with filter circuit 400 of electric power reception device 20. Values for $\omega \cdot Z02$ in capacitance C3 of capacitor 412 and capacitance C4 of capacitor 416 do not necessarily have to strictly match with each other, and deviation therebetween approximately up to ±10% is allowed. Similarly, values for $Z02/\omega$ in inductance L3 of coil 414 and inductance L4 of coil 418 do not necessarily have to strictly match with each other either, and deviation therebetween approximately up to ±10% is allowed.

Figure 2:
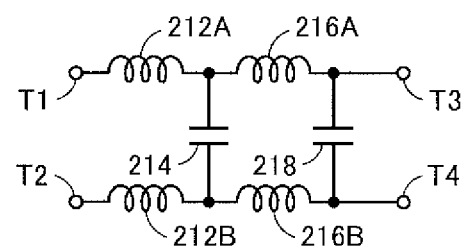
FIG. 2 is a diagram showing another configuration of a filter circuit.

In the embodiment above, though coils 212 and 216 are provided in one of the power line pair in filter circuit 200 of electric power transmission device 10, as shown in FIG. 2, each of coils 212 and 216 may be divided into two and provided in balance in both of the power line pair. In this case, an inductance L1A of each of coils 212A and 212B and an inductance L2A of each of coils 216A and 216B are set to values shown below.

$$L1A = Z01/(2 \cdot \omega) [H]$$

$$L2A = a1 \cdot Z01/(2 \cdot \omega) [H]$$

Figure 3:
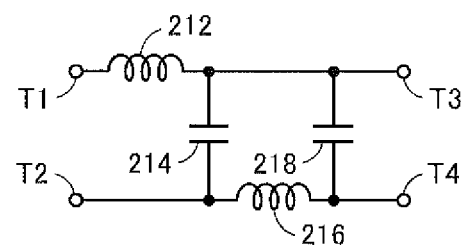
FIG. 3 is a diagram showing yet another configuration of a filter circuit.
Figure 4:
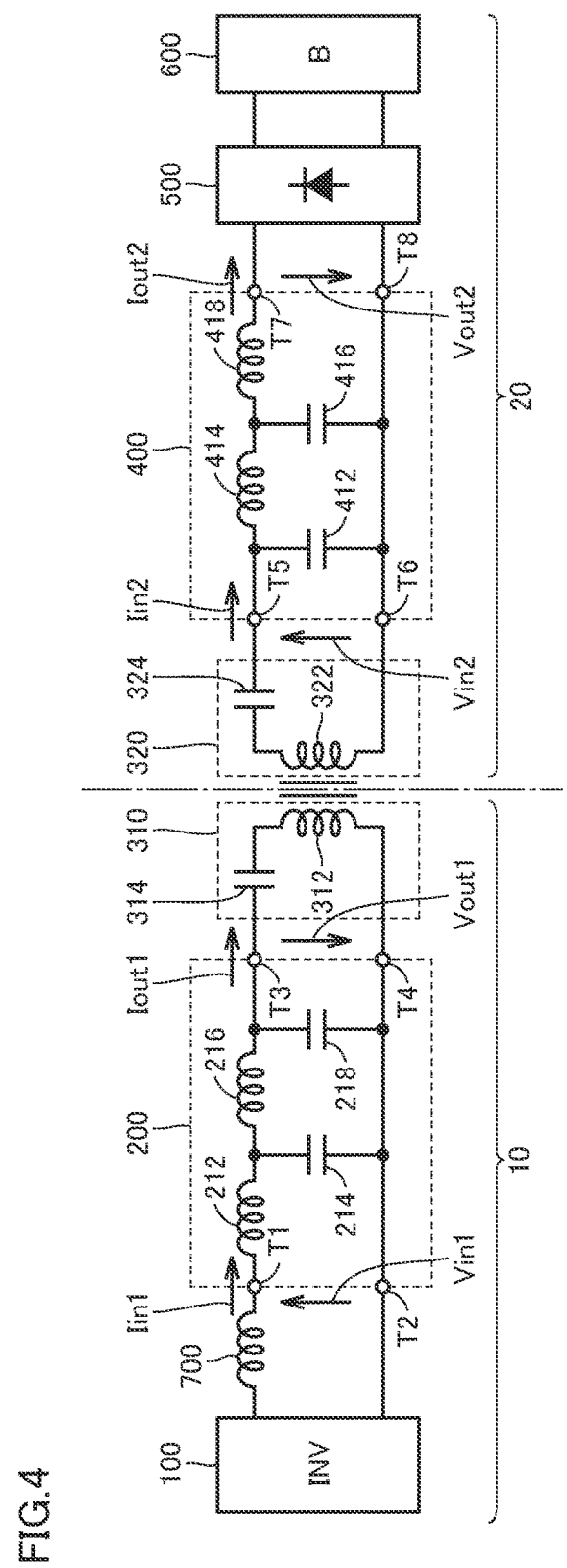
FIG. 4 is a diagram showing even yet another configuration of a filter circuit.

As shown in FIG. 3, one of coils 212 and 216 may be provided in one of the power line pair and the other of coils 212 and 216 may be provided in the other of the power line pair. Inductances of coils 212 and 216 in this case are as shown in the expressions (1) and (3) above.

Though coils 414 and 418 are provided in one of the power line pair also in filter circuit 400 of electric power reception device 20, each of coils 414 and 418 may be divided into two and provided in balance in both of the power line pair (not shown). In this case, an inductance L3A of each coil resulting from division of coil 414 into two and an inductance L4A of each coil resulting from division of coil 418 into two are set to values shown below.

$$L3A = (a2+1) \cdot Z02/(2 \cdot \omega)[H]$$

$$L4A = a2 \cdot (a2+1) \cdot Z02/(2 \cdot \omega)[H]$$

One of coils 414 and 418 may be provided in one of the power line pair and the other of coils 414 and 418 may be provided in the other of the power line pair (not shown). Inductances of coils 414 and 418 in this case are as shown in the expressions (9) and (11) above.

Though an L-C-L-C type fourth-order filter in which an inverter 100 side is inductive has been adopted for filter circuit 200 of electric power transmission device 10 in the embodiment above, a C-L-C-L type fourth-order filter in which the inverter 100 side is capacitive can also be adopted. In the case of the C-L-C-L type fourth-order filter, magnitude of each element can be set to a value obtained by replacing a2 and Z02 in the expressions (8) to (11) above with a1 and Z01, respectively. When a C-L-C-L type fourth-order filter is adopted for filter circuit 200, a high current may flow through a capacitor in a first stage when viewed from inverter 100, and a resonant frequency of electric power transmission portion 310 may vary under the influence of a coil in a final stage when viewed from inverter 100. Therefore, an L-C-L-C type fourth-order filter is preferably adopted for filter circuit 200.

Though a C-L-C-L type fourth-order filter in which an electric power reception portion 320 side is capacitive has been adopted for filter circuit 400 of electric power reception device 20 in the embodiment above, an L-C-L-C type fourth-order filter in which the electric power reception portion 320 side is inductive can also be adopted. In the case of the L-C-L-C type fourth-order filter, magnitude of each element can be set to a value obtained by replacing a1 and Z01 in the expressions (1) to (4) above with a2 and Z02, respectively. When an L-C-L-C type fourth-order filter is adopted for filter circuit 400, a resonant frequency of electric power reception portion 320 may vary under the influence of a coil in a first stage when viewed from electric power reception portion 320. In addition, for capacitor input type rectification portion 500, since a final stage of a filter circuit is desirably implemented by a coil, a C-L-C-L type fourth-order filter is preferably adopted for filter circuit 400.

In the embodiment above, though a case of what is called an SS topology (a primary-series secondary-series topology), in which a capacitor is connected in series to a coil in each of electric power transmission portion 310 and electric power reception portion 320, for a configuration of an electric power transfer portion including electric power transmission portion 310 and electric power reception portion 320 has been described above, the configuration of the electric power transfer portion is not limited to the SS topology. For example, what is called an SP topology (a primary-series secondary-parallel topology) in which a capacitor is connected in series to a coil in an electric power transmission portion and a capacitor is connected in parallel to a coil in an electric power reception portion can also be adopted for the electric power transfer portion. When the SP topology is adopted, in order to avoid influence on a resonant frequency of the electric power reception portion, an L-C-L-C type fourth-order filter in which the electric power reception portion 320 side is inductive is preferably adopted for a filter circuit of electric power reception device 20. In this case, since a final stage of the filter circuit is capacitive, rectification portion 500 is preferably implemented by a choke input type rectification circuit.

Though the electric power transfer system in which filter circuits 200 and 400 are provided in electric power transmission device 10 and electric power reception device 20, respectively, has been described in the embodiment above, this invention is not limited to the electric power transfer system in which a filter circuit is provided in both of electric power transmission device 10 and electric power reception device 20. This invention is applicable also to an electric power transfer system in which filter circuit 200 is provided only in electric power transmission device 10 or an electric power transfer system in which filter circuit 400 is provided only in electric power reception device 20.

Though filter circuits 200 and 400 described above do not affect a phase difference of a voltage and a current, a phase of an output current from inverter 100 may advance relative to a phase of an output voltage due to other factors such as variation in a coil or a capacitor of electric power transmission portion 310 and electric power reception portion 320 or fluctuation of a coil value due to influence by a vehicular body. As a current phase of inverter 100 advances, recovery loss is caused, which may disadvantageously lead to lowering in efficiency and failure of inverter 100. Therefore, a coil for phase compensation may be arranged on the output side of inverter 100 so as to suppress phase advance of a current.

For example, an inductance Ls of a phase compensation coil for setting phase advance of a current to 0 is defined as $(Z_{inv}/\omega) \times \tan \varphi$, where $Z_{inv}$ represents an impedance real part of an output portion of inverter 100 and $\varphi$ represents an advance angle of a current. Actually, $Z_{inv}$ fluctuates depending on a condition, and an allowable advance angle of a current of inverter 100 is also different depending on a switching element or a heat radiation design. Therefore, a value optimal for a system is set for inductance Ls of the phase compensation coil.

The phase compensation coil is arranged between inverter 100 and coil 212 of filter circuit 200. In a case that an L-C-L-C type fourth-order filter in which the inverter 100 side is inductive implements filter circuit 200, the phase compensation coil and coil 212 of filter circuit 200 are connected in series. Therefore, in order to reduce the number of parts, the phase compensation coil and coil 212 may be integrated into a single coil. In this case, inductance L1 of coil 212 integrated with the phase compensation coil is set to $(Z01/\omega°Ls)$.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An electric power transmission device, comprising:
    an alternating-current power supply;
    an electric power transmission portion configured to transmit in a non-contact manner, electric power output from said alternating-current power supply to an electric power reception device; and
    a filter circuit provided between said alternating-current power supply and said electric power transmission portion,
    said filter circuit including
        first and second coils provided in at least one of a power line pair connected between said alternating-current power supply and said electric power transmission portion, and
        first and second capacitors each connected between said power line pair and provided alternately with said first and second coils between said alternating-current power supply and said electric power transmission portion,
    said first and second coils and said first and second capacitors being provided in an order of said first coil, said first capacitor, said second coil, and said second capacitor from a side of said alternating-current power supply, and
    an inductance of said first coil being set to $Z/\omega$,
    a capacitance of said first capacitor being set to $(a+1)/(a\omega Z)$,
    an inductance of said second coil being set to $aZ/\omega$, and
    a capacitance of said second capacitor being set to $(a+1)/(a^2\omega Z)$, where $\omega$ represents a frequency of said alternating-current power supply, a represents a ratio of an output voltage from said filter circuit to an input voltage to said filter circuit, and Z represents any design value.

2. The electric power transmission device according to claim 1, wherein
    said alternating-current power supply includes a voltage type inverter.

3. The electric power transmission device according to claim 2, wherein
said a is determined based on a rated voltage of said voltage type inverter and a maximum value which is taken by a voltage of said electric power transmission portion.

4. The electric power transmission device according to claim 1, wherein
said first coil is implemented by third and fourth coils resulting from division into two and provided in balance in both of said power line pair,
said second coil is implemented by fifth and sixth coils resulting from division into two and provided in balance in both of said power line pair,
an inductance of each of said third and fourth coils is set to $Z/(2\omega)$, and
an inductance of each of said fifth and sixth coils is set to $aZ/(2\omega)$.

5. The electric power transmission device according to claim 1, further comprising a phase compensation coil provided on an output side of said alternating-current power supply, for suppressing phase advance of an output current from said alternating-current power supply.

6. The electric power transmission device according to claim 5, wherein
said phase compensation coil is integrated with said first coil.

7. An electric power reception device, comprising:
an electric power reception portion configured to receive in a non-contact manner, alternating-current electric power output from an electric power transmission device;
a rectification portion rectifying alternating-current electric power received by said electric power reception portion; and
a filter circuit provided between said electric power reception portion and said rectification portion,
said filter circuit including
first and second coils provided in at least one of a power line pair connected between said electric power reception portion and said rectification portion, and
first and second capacitors each connected between said power line pair and provided alternately with said first and second coils between said electric power reception portion and said rectification portion,
said first and second coils and said first and second capacitors being provided in an order of said first capacitor, said first coil, said second capacitor, and said second coil from a side of said electric power reception portion, and
a capacitance of said first capacitor being set to $1/(\omega Z)$,
an inductance of said first coil being set to $(a+1)Z/\omega$,
a capacitance of said second capacitor being set to $1/(a\omega Z)$, and
an inductance of said second coil being set to $a(a+1)Z/\omega$,
where $\omega$ represents a frequency of said alternating-current electric power, a represents a ratio of an output voltage from said filter circuit to an input voltage to said filter circuit, and Z represents any design value.

8. The electric power reception device according to claim 7, wherein
said rectification portion is implemented by a capacitor input type rectification circuit.

9. The electric power reception device according to claim 7, wherein
said a is set to $4V/(\pi\sqrt{2Pk\omega L})$,
where V represents an output voltage from said rectification portion, P represents electric power received by said electric power reception portion, k represents a coefficient of coupling, and L represents an inductance of a coil of each of said electric power reception portion and an electric power transmission portion of said electric power transmission device.

10. The electric power reception device according to claim 7, wherein
said first coil is implemented by third and fourth coils resulting from division into two and provided in balance in both of said power line pair,
said second coil is implemented by fifth and sixth coils resulting from division into two and provided in balance in both of said power line pair,
an inductance of each of said third and fourth coils is set to $(a+1)Z/(2\omega)$, and
an inductance of each of said fifth and sixth coils is set to $a(a+1)Z/(2\omega)$.

11. A vehicle comprising the electric power reception device according to claim 7.

* * * * *